US008666427B2

(12) United States Patent
Chen et al.

(10) Patent No.: US 8,666,427 B2
(45) Date of Patent: Mar. 4, 2014

(54) METHOD FOR MOBILE COMMUNICATION AND SYSTEM THEREOF (75) Inventors: Ming-Bing Chen, Taipei (TW); Hao-Wen Chen, legal representative, Taipei (TW); Yan-Xiu Zheng, Taipei County (TW); Yung-Han Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 12/756,181

(22) Filed: Apr. 8, 2010

(65) Prior Publication Data

US 2011/0014915 A1 Jan. 20, 2011

Related U.S. Application Data (60) Provisional application No. 61/167,664, filed on Apr. 8, 2009, provisional application No. 61/168,413, filed on Apr. 10, 2009.

(30) Foreign Application Priority Data

Apr. 2, 2010 (TW) ................................ 99110382 A (51) Int. Cl.
*H04W 24/00* (2009.01)
(52) U.S. Cl.
USPC ........ 455/452.2; 455/437; 455/450; 455/464; 455/561; 455/13.1; 455/13.4; 370/341; 370/431; 370/468; 370/332; 370/315; 370/316; 370/318; 370/331; 370/328; 370/310.2
(58) Field of Classification Search
USPC ............. 455/452.2, 437, 450, 464, 561, 13.1, 455/13.4; 370/341, 431, 468, 332, 315, 370/316, 318, 331, 328, 310.2
See application file for complete search history.

(56) References Cited

U.S. PATENT DOCUMENTS 7,408,901 B1 * 8/2008 Narayanabhatla ............ 370/331
7,450,947 B2 11/2008 Kuffner et al.
(Continued)

FOREIGN PATENT DOCUMENTS

| EP | 1940049 | 7/2008 |
| EP | 2019512 | 1/2009 |
| EP | 2031924 | 3/2009 |

OTHER PUBLICATIONS

U.S. Appl. No. 12/704,405, filed Feb. 11, 2010, Chou et al.

(Continued)

*Primary Examiner* — Nimesh Patel
(74) *Attorney, Agent, or Firm* — Jianq Chyun IP Office (57) ABSTRACT A method for mobile communication and a system thereof are provided. The system for mobile communication includes a main base station and a plurality of sub-communication devices. The sub-communication device is one of a sub-base station and a user equipment. The sub-base stations and the user equipments are located in the macrocell of the main base station. The method includes the following steps. First, locations of the sub-communication devices are obtained. Then, the sub-communication devices are grouped based on the locations of the sub-communication devices. And, an allocation of resource blocks is obtained according to the grouping results. The sub-communication devices receive the allocation of resource blocks for control signaling and data transmission. And, the usage of same resource blocks are enabled by the sub-base station allocated in the same resource blocks in response to receipt of the allocation.

24 Claims, 8 Drawing Sheets

(56) References Cited

U.S. PATENT DOCUMENTS

| | | |
|---|---|---|
| 7,519,013 B2 | 4/2009 | Destino et al. |
| 2006/0286934 A1* | 12/2006 | Kuffner et al. ............... 455/63.1 |
| 2007/0160014 A1 | 7/2007 | Larsson |
| 2009/0080375 A1* | 3/2009 | Jalil et al. ...................... 370/329 |
| 2009/0088164 A1 | 4/2009 | Shen et al. |
| 2010/0062798 A1* | 3/2010 | Poe et al. ...................... 455/509 |
| 2012/0003962 A1* | 1/2012 | Jeon et al. ..................... 455/411 |

OTHER PUBLICATIONS

"Office Action of Taiwan Counterpart Application", issued on Apr. 24, 2013, p1-p8, in which the listed references were cited.

\* cited by examiner

Table 1

METHOD FOR MOBILE COMMUNICATION AND SYSTEM THEREOF

CROSS-REFERENCE TO RELATED APPLICATION

This application claims priority benefits of U.S. Patent Provisional Application No. 61/167,664, filed on Apr. 8, 2009 and U.S. Provisional Application No. 61/168,413, filed on Apr. 10, 2009. This application also claims the priority benefit of Taiwan application serial no. 99110382, filed on Apr. 2, 2010. The entirety of each of the above-mentioned patent applications is hereby incorporated by reference herein and made a part of this specification.

TECHNICAL FIELD

The present disclosure relates to a mobile communication technique. More particularly, the present disclosure relates to a mobile communication method and a system thereof for grouping sub-base stations and user equipments according to their locations, and allocating resource blocks according to the grouping result.

BACKGROUND

To construct and provide a convenient and fast information transmission environment, telecom service providers constantly develop and ameliorate existing mobile communication network techniques, for example, the currently widely used universal mobile telecommunications system (UMTS) of $3^{rd}$ generation (3G) mobile communication technology, UMTS terrestrial radio access network (UTRAN), GERAN (GSM/EDGE) system, worldwide interoperability for microwave access (WiMAX) system and other wireless network techniques are simultaneously developed and ameliorated.

In many mobile communication networks, a base station (BS) is generally used as a communication accessing point for a plurality of wireless communication devices. Wherein, the wireless communication device can be a mobile station (MS) (for example, a mobile phone) or a user equipment (UE) (for example, a notebook computer), etc. Certainly, the MS can also be the UE, and vice versa. The wireless communication device can be an immobile device (for example, a personal computer (PC)) or a mobile device (for example, a cellular phone, a laptop computer or other mobile communication devices). Moreover, recent network developments of the mobile communication network all focus on ameliorating an effect of wireless broadband access (WBA). Since a coverage range (which is also referred to as a macro coverage area) of a macro BS is wide, the supported mobile communications devices within such coverage range are numerous, so that the macro BS has a relatively heavy burden in communication. The macro BS and the macro coverage area thereof are altogether referred to as a macrocell. Moreover, a difficulty for constructing the macro BS is increased due to factors such as environmental protection and remonstrations, etc., and an indoor communication performance may have communication dead corners due to factors such as a construction location of the macro BS, shielding of the building or other obstacles, etc., so that the indoor communication quality can be uneven. Therefore, construction of a local or a sub-BS (for example, an ultra-micro BS or a Femto BS, or a home BS) is a good solution for increasing the indoor communication performance.

Properties such as low power and high bandwidth of the sub-BS allow a user to install the mobile communication accessing point by himself, and the sub-BS can provide a sub coverage area with a relatively small coverage range. The Femto BS and the sub coverage area thereof are altogether referred to as a femtocell, which can be disposed in a residential district or a small business environment for utilization. A local femtocell can be constructed and added to a part of regions of a macrocell, so as to cope with a requirement of high intensity mobile communication. Moreover, the sub-BS can be connected to a core network through a cable communication access mechanism of a digital subscriber line (DSL), so as to enjoy a broadband mobile communication service. In overall, explanation of the advantages for constructing the sub-BS is twofold. In view of a telecom practitioner, the advantages include (1) a backhaul capacity requirement is reduced; (2) a wireless capacity is increased; (3) loopholes of the coverage range are reduced and new integrated services are provided. In view of a customer, the advantages include (1) a good indoor coverage range and quality is achieved without changing a phone; and (2) one phone-one phone number and regional specific price are achieved.

However, since the coverage areas of the macro BS and the sub-BS are often overlapped, interference is occurred during signal transmission. Moreover, a transmission quality of the macro BS is decreased due to the interference or allocation of resource blocks.

SUMMARY

A method for mobile communication is introduced herein. The method for mobile communication is adapted to a mobile communication system. The mobile communication system includes a main BS and a plurality of sub-communication devices. Each of the sub-communication devices is one of a sub-BS and a user equipment. Wherein, a sub coverage area of the sub-BS and a location of the user equipment are located in a main coverage area of the main BS. The method includes the following steps. Sub-communication device information is obtained, wherein the sub-communication device information includes locations of the sub-communication devices. And, the sub-communication devices are grouped based on the locations of the sub-communication devices. And, an allocation of resource blocks is obtained according to a grouping result. The sub-communication devices receive the allocation of the resource blocks for controlling signalling, data transmission and data reception. And, usages of same resource blocks are enabled by the sub-communication devices allocated in the same resource blocks in response to receipt of the allocation.

A mobile communication system is introduced herein. The mobile communication system includes a main BS, a plurality of sub-communication devices and a location server. Each of the sub-communication devices is one of a sub-BS and a user equipment. Wherein, a sub coverage area of the sub-BS and a location of the user equipment are located in a main coverage area of the main BS. The location server is used for obtaining sub-communication device information, wherein the sub-communication device information includes locations of the sub-communication devices. And, the location server groups the sub-communication devices based on the locations of the sub-communication devices. And, the main BS and the sub-BS obtain an allocation of resource blocks according to a grouping result. The sub-communication devices allocated in same resource blocks enable usages of the same resource blocks in response to receipt of the allocation.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Reference will now be made in detail to the embodiments of the disclosure, examples of which are illustrated in the accompanying drawings. Wherever possible, the same reference numbers are used in the drawings and the description to refer to the same or like parts.

When a sub-base station (sub-BS) is disposed in a macrocell of a macro BS (which is also referred to as a main BS in the present exemplary embodiment), the sub-BS is constantly interacted with the macro BS. In a mobile communication network, operation parameters including carrier frequency, power, bandwidth, and etc. of an individual sub-BS can be set by planning the sub-BS. In case that resource blocks are limited, a network performance can be ameliorated according to the frequency reuse concept. During the planning process, the on-site investigation may be needed to obtain information required for setting the operation parameters, wherein the information includes the coverage area of every type of BS and signal region of the user equipment, which is also named as the coverage area of user equipment. When the sub-BS is installed, the plug-and-play is usually involved to make installation simpler, and the method of manually planning the sub-BS is probably inappropriate for general users.

Figure 1:
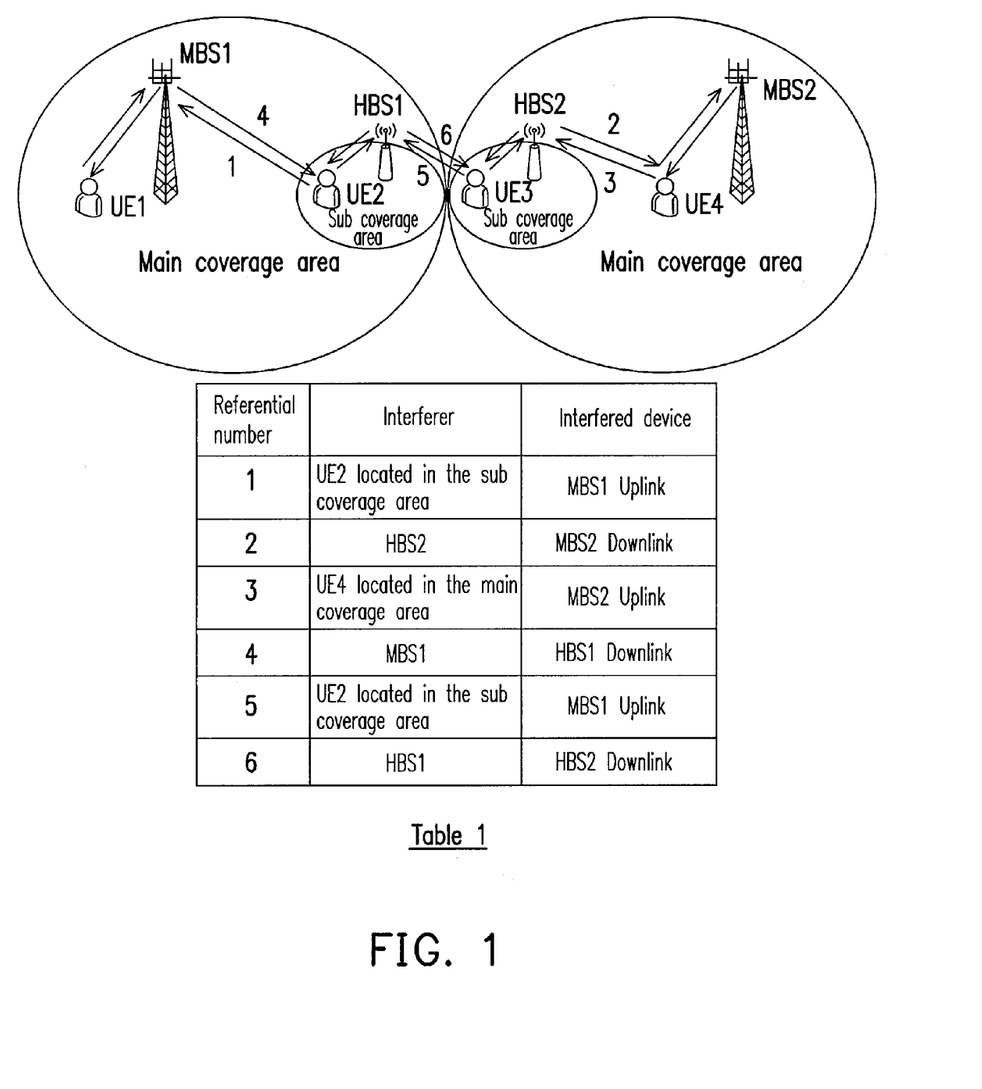
FIG. 1 is a diagram illustrating six examples of interference probably occurred between main base stations (BSs) and sub-BSs in a mobile communication network.

Another planning method relates to automatic allocation of the resource blocks, by which interference between the main BS and the sub-BSs can be avoided according to a time division mechanism (TDM) and/or a frequency division mechanism (FDM). However, the amount of sub-BSs within a macrocell can be excessive, it is inevitable for sub-BSs to use the same transmission frequencies/resource blocks as main BS, which may cause degradation of communication quality and performance. FIG. 1 is a diagram illustrating six examples of interference probably occurred between main BSs MBS and sub-BSs in a mobile communication network. FIG. 1 includes table 1. In case of the situations listed in table 1, the user equipments UE1 and UE4 in the main coverage areas, the user equipments UE2 and UE3 in the sub coverage areas may all influence downlink and uplink of the main BSs MBS 1 and MBS2 and the sub-BSs HBS1 and HBS2. It should be noticed that FIG. 1 is not drawn to scale, which is only a schematic diagram of various situations.

Figure 2:
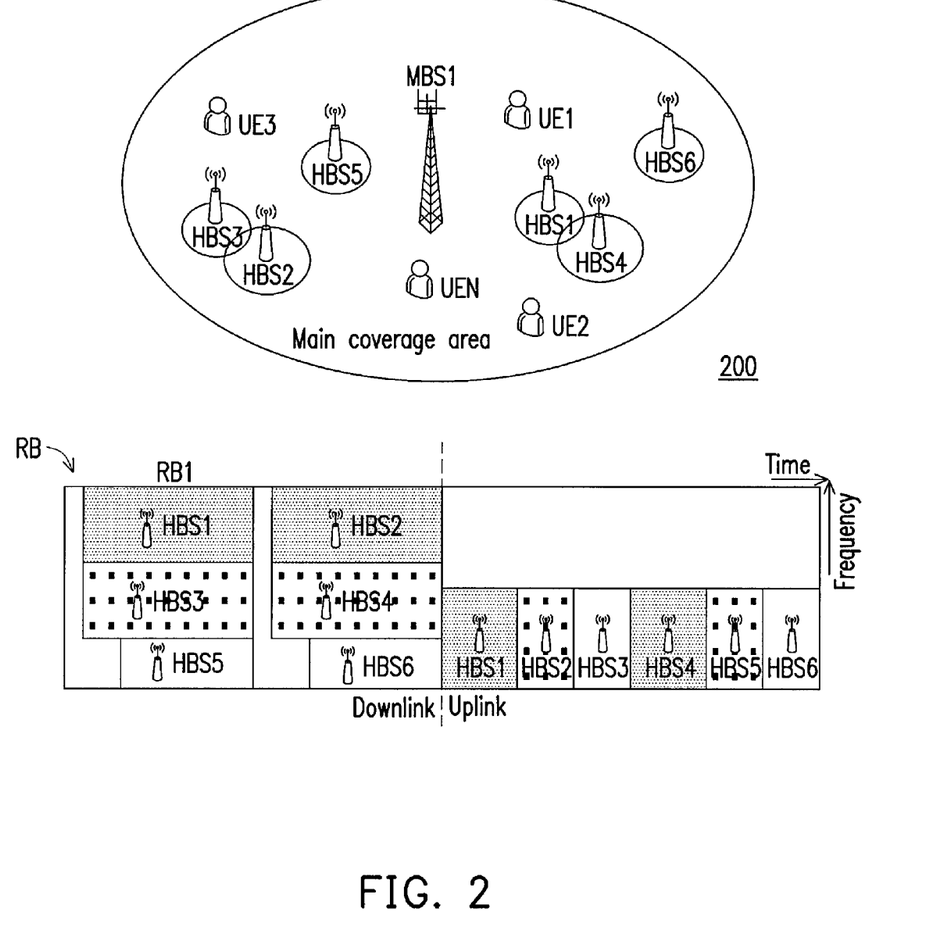
FIG. 2 is a schematic diagram and a frame structure of a mobile communication system using a method of reserving resource blocks to avoid interference according to an exemplary embodiment of the present disclosure.

Therefore, the exemplary embodiment provides the following concept. When resource blocks are allocated, the main BS MBS1 reserves a part of the resource blocks (RBs) for the sub-BSs HBS1-HBS6 to avoid the mutual interference. Referring to FIG. 2, FIG. 2 shows a schematic diagram and a frame structure of a mobile communication system 200 using a method of reserving resource blocks RB to avoid the interference according to an exemplary embodiment of the present disclosure. In the present exemplary embodiment, the sub coverage areas of the sub-BSs HBS1-HBS6 and the user equipments UE1-UEN are all located within the main coverage area of the main BS MBS1, wherein N is a positive integer.

The resource blocks RB can be represented in unit of frequency domain and time domain. The unit in frequency domain includes the number of carriers, the number of subcarriers, or the unit used for bandwidth. The unit in time domain includes the number of transmission frame, the number of partial transmission frame, or the unit used for time interval. A transmission frame can be divided into multiple RBs. Some RBs may be for downlink transmission, and some RBs may be for uplink transmission. RBs are reserved for the main BS MBS1 or the sub-BSs HBS1-HBS6 to transmit signal to the user equipments within the coverage areas thereof. A frame can be partitioned into two parts. In FIG. 2, the RBs in left part of the frame are used for downlink transmission from the main BS MBS1 or the sub-BSs HBS1-HBS6 to the user equipments, i.e. the main BS MBS1 or the sub-BSs HBS1-HBS6 use the resource blocks (including the transmission bandwidths and the time intervals) shown in FIG. 2 to transmit signal to the users equipments within the coverage areas thereof. Comparatively, the RBs in right part of the frame in FIG. 2 are used for uplink transmission by the user equipments for transmitting signal to the main BS MBS 1 or the sub-BSs HBS1-HBS6. In the present exemplary embodiment, the allocation of the resource blocks includes a plurality of resource allocation units, and each of the resource allocation units includes a frequency allocation, a time allocation, a frequency-time block, an allocated power level, an allocated code, etc., or any combination of aforementioned resource allocation units.

According to FIG. 2, it is known that a part of the resource blocks RB are reserved to the sub-BSs HBS1-HBS6, so that the main BS MBS1 cannot use the reserved resource blocks RB. For example, if a first resource block RB1 is already reserved to the sub-BS HBS1, the main BS MBS1 is prohibited to use the first resource block RB 1 to transmit signal. Comparatively, the unreserved resource blocks RB can be used by the main BS MBS1, and now each of the sub-BSs HBS1-HBS6 cannot use the unreserved resource blocks RB, so as to avoid the mutual interference. However, it is possible that RBs are not enough to be divided for the sub-BSs HBS1-HBS6 in the main coverage area because there are too many sub-BSs HBS1-HBS6 or the amount of available RBs is not enough to fulfil the bandwidth requirement of every sub-BS. The lack of RBs in the main BS MBS1 will be more serious when providing communication services to user equipments.

Therefore, in some exemplary embodiments of the present disclosure, the sub-communication devices can be grouped according to the locations of the sub-BSs and the user equipments and mutual interference levels thereof. Moreover, the resource blocks RB are allocated according to the grouping result, so that the main BS and the sub-BSs can simultaneously transmit and receive signal, and the mutual interferences are reduced, so as to improve the communication quality and the communication performance. Therefore, according to the present disclosure, a usage rate of the resource blocks is increased, and meanwhile the interferences shown in FIG. 1 can be avoided or mitigated.

Figure 3:
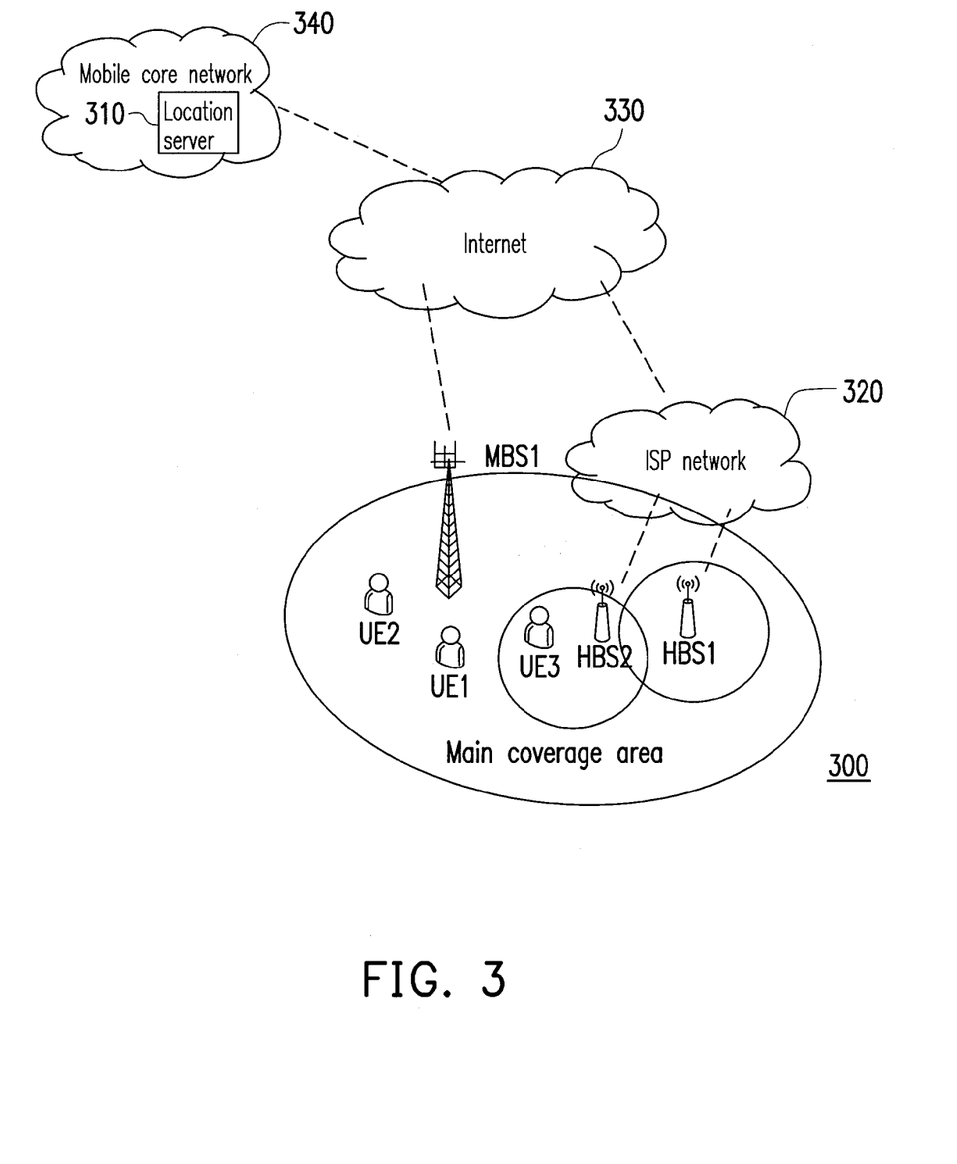
FIG. 3 is a schematic diagram illustrating a mobile communication system according to an exemplary embodiment of the present disclosure.

Referring to FIG. 3, FIG. 3 is a schematic diagram illustrating a mobile communication system 300 according to an exemplary embodiment of the present disclosure. The mobile communication system 300 includes a main BS MBS1, sub-BSs HBS1 and HBS2, user equipments UE1-UE3 and a location server 310. The sub-BSs HBS1 and HBS2 and the user equipments UE1-UE3 are all referred to as sub-communication devices. Sub coverage areas of the sub-BSs HBS1 and HBS2 and locations of the user equipments UE1-UE3 are all within the main coverage area of the main BS MBS1. In the present exemplary embodiment, the sub-BSs HBS1 and HBS2 are connected to the Internet 330 through an Internet service provider (ISP) network 320 (for example, digital subscriber lines (DSL) or fiber-optic cables or cable modem) provided by the ISP, and the main BS MBS1 is also connected to the Internet 330. The location server 310 is disposed in a mobile core network 340 and is connected to the Internet 330, so as to connect the main BS MBS1 and the sub-BSs HBS1 and HBS2. The ISP network 320, the Internet 330 and the mobile core network 340 are altogether referred to as a backhaul of the mobile communication system 300.

Figure 4:
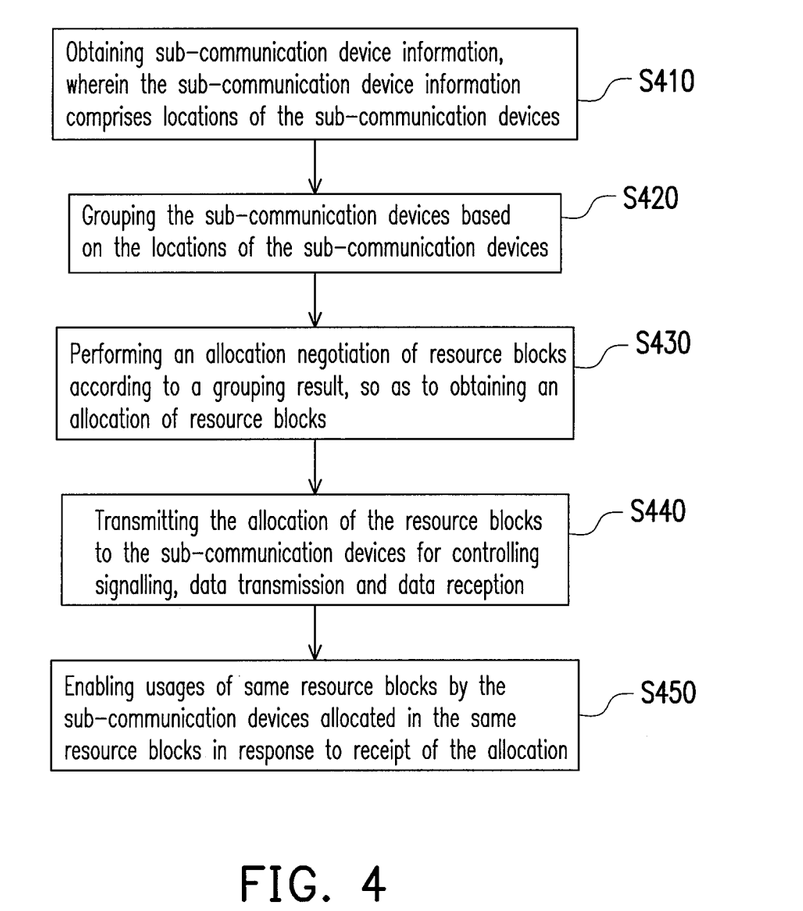
FIG. 4 is a flowchart illustrating a method for mobile communication according to an exemplary embodiment of the present disclosure.
Figure 5:
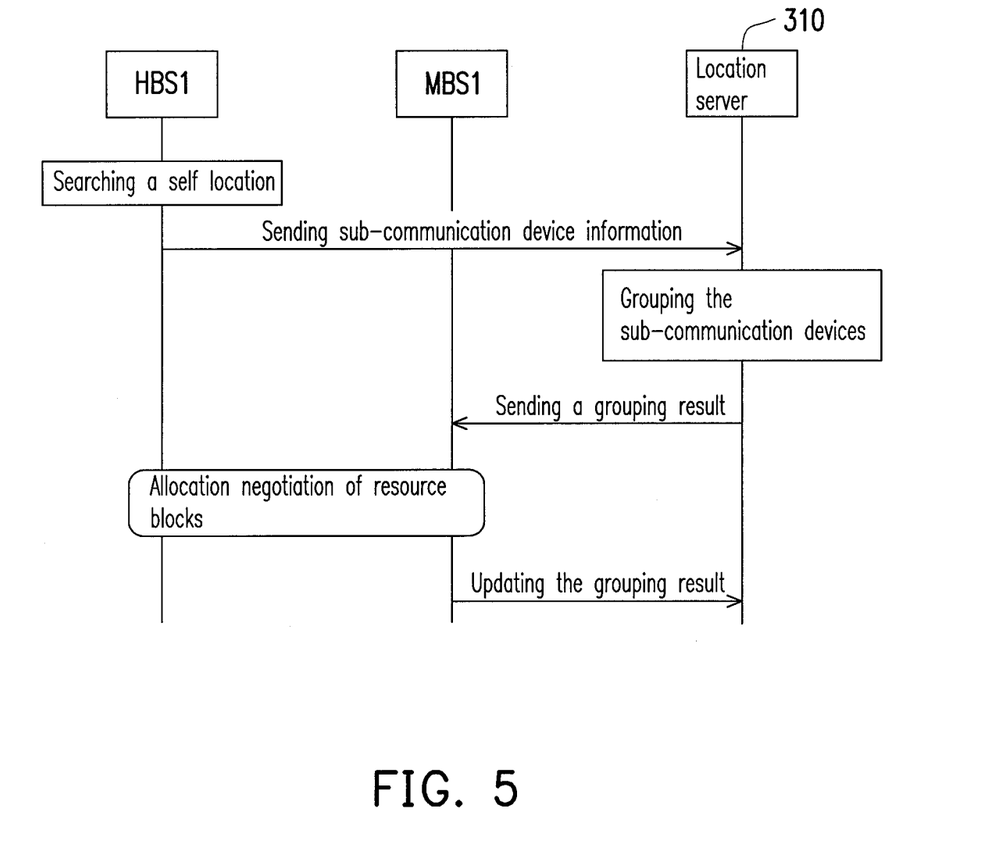
FIG. 5 is a control structural diagram illustrating a method for mobile communication according to an exemplary embodiment of the present disclosure.

The exemplary embodiment of the present disclosure is described in detail below. Referring to FIG. 4 and FIG. 5, FIG. 4 is a flowchart illustrating a method for mobile communication according to an exemplary embodiment of the present disclosure, and FIG. 5 is a control structural diagram illustrating a method for mobile communication according to an exemplary embodiment of the present disclosure. In the present exemplary embodiment, a situation that the sub-BS HBS1 is initialised in the main coverage area of the main BS MBS1 is taken as an example for description. In other exemplary embodiments, the sub-BS HBS1 can also be replaced by a sub-communication device (for example, a user equipment).

In step S410, when the sub-BS HBS1 is initialised, the sub-BS HBS1 first searches its own location. Then, the location information and information such as an interference level between the sub-communication devices, and bandwidth requirements of the user equipments within the sub coverage area of the sub-BS HBS1 are combined to form sub-communication device information, and the sub-communication device information is transmitted to the location server 310 through the backhaul. The location server 310 also contains location information of other initialised sub-communication devices. In the present exemplary embodiment, the sub-BS HBS1 can obtain its own location through a global positioning system (GPS). In other exemplary embodiments, an approximate location of the sub-BS HBS1 can be determined through a router or a gateway of the Internet or the ISP network, so that how to obtain the location information or whether the location information is obtained by the sub-BS itself is not limited by the present disclosure. Certainly, there is a possibility that the location information of a certain sub-BS cannot be obtained.

Next, in step S420, the location server 310 first divides the sub-communication devices into two types, location information un-reportable and location information reportable, according to whether the location information, etc. of the sub-communication devices is known and reported to the main BS MBS1. The main BS MBS1 gathers information such as interference level, required resources, position, capabilities of operating frequencies, spectrum sensing, and etc. After acquiring the aforementioned information, the main BS MBS1 partitions RBs into two regions, position-insensitive and position-intensive. Wherein, regarding the sub-communication devices of the location information un-reportable, the main BS MBS1 or the location server 310 first groups these sub-communication devices to use position-insensitive RB regions, and regarding the sub-communication devices of the location information reportable, the main BS MBS1 or the location server 310 groups these sub-communication to use position-intensive RB regions. If the above grouping operation is implemented by the location server 310, the grouping result and information generated according to the location information of the sub-communication devices is sent to the main BS MBS1. In the present exemplary embodiment, such grouping operation can be executed by the main BS MBS1 or the location server 310, though the present disclosure is not limited thereto.

In step S430, since the bandwidth required by each of the sub-BSs is different, and the sub-BS HBS1 only uses limited and fixed resource blocks, an allocation of the resource blocks has to be negotiated between the main BS MBS1 and the sub-BS HBS1 according to the grouping information, so as to obtain the allocation of the resource blocks. Wherein, the sub-communication devices allocated in the same or partially overlapped resource blocks can simultaneously transmit signal by using a same frequency, so as to reduce a mutual interference. Moreover, a magnitude of the resource blocks required by each of the sub-communication device is probably different, so that the sub-communication device requiring relatively less resource blocks are probably belonged to a part of the allocated resource blocks, and the other unoccupied resource blocks can be assigned to the sub-communication devices requiring relatively more resource blocks through allocation negotiation. In the present exemplary embodiment, after the allocation negotiation of the resource blocks are completed, the main BS MBS1 can update the grouping information in the location server 310 for utilization of a next allocation negotiation of the resource blocks.

In step S440, the sub-BS HBS1 and the user equipments (which are all referred to as the sub-communication devices) within the main coverage area of the main BS MBS1 receives the above allocation of the resource blocks for controlling signalling, data transmission and data reception. Wherein, the sub-BS HBS1 can use the backhaul to receive the allocation of the resource blocks RB, and can also receive such allocation from broadcasting information of the main BS MBS1. Moreover, the user equipments that transmit signal through the main BS MBS1 can also receive such allocation from the broadcasting information of the main BS MBS1, which is not limited by the present disclosure. Next, in step S450, each of the sub-communication devices allocated in the same resource blocks RB can enable the usage of the same resource blocks RB in response to receipt of the allocation. For example, the sub-communication devices allocated in the same resource blocks RB can simultaneously transmit signal by using the same frequency. According to the above method, the interference between the main BS MBS1 and the sub-communication devices can be avoided or mitigated, and a user can enjoy a relatively great data transmission rate.

Figure 6:
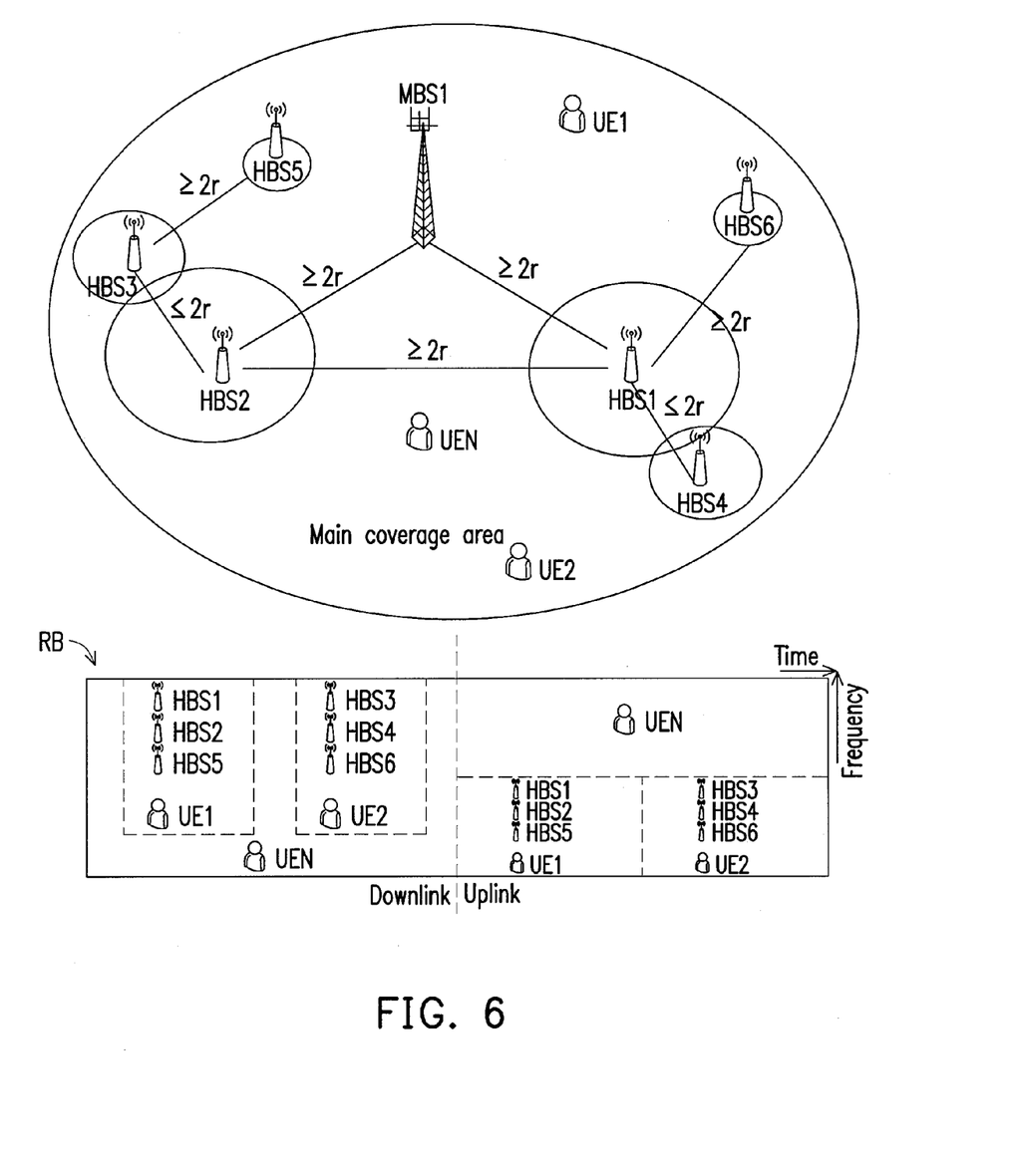
FIG. 6 is a schematic diagram illustrating a grouping method according to an exemplary embodiment of the present disclosure.

There is a plurality of methods for grouping the sub-communication devices, and two grouping methods are described below. These methods are all used for finding the sub-communication devices with relatively low mutual interference, so as to allocate them to the same or partially overlapped resource blocks RB, so that these sub-communication devices can simultaneously transmit signal by using the same frequency. Therefore, the present disclosure is not limited to the above two methods. FIG. 6 is a schematic diagram illustrating a grouping method according to an exemplary embodiment of the present disclosure. Wherein, "r" represents a radius of the sub coverage area of the sub-BSs HBS1-HBS6. In the present exemplary embodiment, the user equipment UE1-UE3 and the sub-BSs HBS1-HBS6 are all grouped into the group of using RB region used by position-intensive devices, and can obtain their own location information by themselves. The user equipment UEN is grouped into the group of using RB region used by position-insensitive devices, and cannot detect its own position, so that it is controlled by the main BS MBS1. Referring to FIG. 6 and a following table 2 for a first grouping method.

TABLE 2

| First group | Second group | Third group | Fourth group |
|---|---|---|---|
| HBS1 | HBS2 | HBS5 | |
| HBS4 | HBS3 | | HBS6 |

As shown in FIG. 6, when a relative distance between the sub-BSs HBS1 and HBS4 is less than "2r" (which is also referred to as a distance threshold), it represents that the sub coverage areas of the sub-BSs HBS1 and HBS4 are partially overlapped. The distance threshold is probably varied along with various factors such as a communication environment, which is not limited by the present disclosure. In the present exemplary embodiment, the location server 310 respectively groups the partially overlapped sub-BSs HBS1 and HBS4, and the sub-BSs HBS2 and HBS3 into one group, and a grouping result thereof is as that shown in the table 2, which is not repeated herein. The grouping method mentioned here can be applied for the user equipment, wherein the coverage area of the user equipment can be decided by measuring channel information including signal strength, interference level, etc.

When the resource blocks RB are allocated, the main BS MBS1 allocates a same resource block to one of the sub-BSs or one of the user equipments of each of the groups. For example, the sub-BS HBS1 of the first group, the sub-BS HBS2 of the second group, the sub-BS HBS5 of the third group and the user equipment UE1 are allocated in the same resource block RB. In this way, when the sub-BS HBS1 of the first group, the sub-BS HBS2 of the second group, the sub-BS HBS5 of the third group uses the same resource block RB, the problem of mutual interference is avoided (since there is none overlapped sub coverage area). Moreover, when the same resource block RB is used, the interference of the uplink/downlink between the main BS MBS1 and the user equipment UE1 to the other sub-BSs HBS1-HBS6 can be reduced by using a directional antenna or adjusting a transmission power, though the present disclosure is not limited thereto.

According to another grouping method, the sub-communication devices (including the sub-BSs HBS1-HBS6 and the user equipments UE1 and UE2) self-detect whether the mutual interferences are occurred, so as to generate the sub-communication device information to the location server 310. The location server 310 groups the sub-communication devices having the mutual interference level less than an interference threshold into one group, which is shown in FIG. 3. Here, assuming the mutual interference level of the first group and the second group are all less than the interference threshold.

TABLE 3

| First group | Second group |
|---|---|
| HBS1 | HBS3 |
| HBS2 | HBS4 |
| HBS5 | HBS6 |
| UE1 | UE2 |

As shown in FIG. 6 and the table 3, since the mutual interference level of the sub-communication devices of the same group is relatively low, the same resource block RB is allocated to the sub-communication devices of the same group. In this way, the main BS MBS1 and the sub-BSs HBS1-HBS6 can simultaneously transmit signal, so that decrease of the communication quality due to the mutual interference is avoided.

Figure 7:
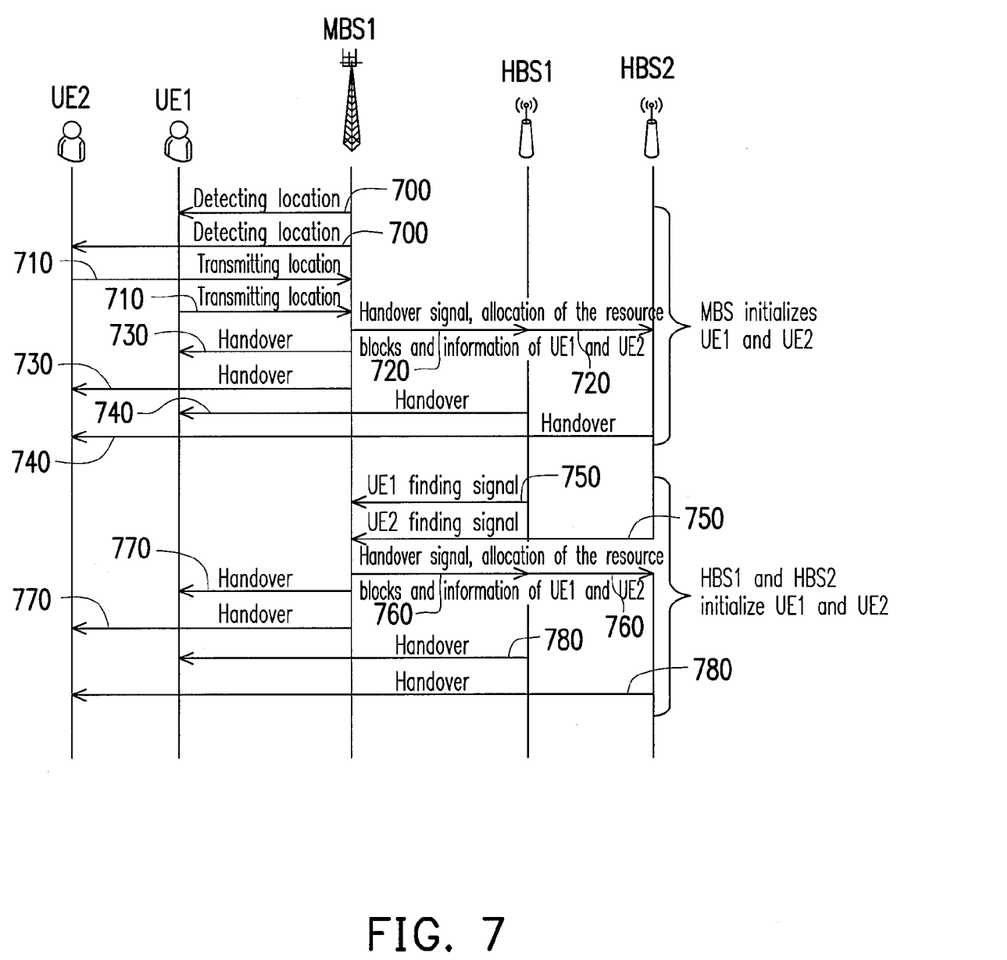
FIG. 7 is a control structural diagram illustrating a process of handover of user equipments entering sub-BSs according to an exemplary embodiment of the present disclosure.

Moreover, to maintain communication states of the user equipments UE1 and UE2 to an optimal quality, when the user equipments UE1 and UE2 are respectively moved to the sub coverage areas of the sub-BSs HBS1 and HBS2 from the main coverage area, control rights of the user equipments UE1 and UE2 can be respectively handed over from the main BS MBS1 to the sub-BSs HBS1 and HBS2, so as to provide a better service quality. FIG. 7 is a control structural diagram illustrating a process of handing over control rights of the user equipments UE1 and UE2 respectively entering sub coverage areas of the sub-BSs according to an exemplary embodiment of the present disclosure.

As shown in FIG. 7, if the main BS MBS1 first detects that the user equipments UE1 and UE2 are respectively moved to the sub coverage areas of the sub-BSs HBS1 and HBS2 (i.e. the main BS MBS1 initialises the user equipments UE1 and UE2), the main BS MBS1 proposes location detections to the user equipments UE1 and UE2 at a referential number 700, and then the user equipments UE1 and UE2 respectively transmit back their locations at a referential number 710 to confirm that the user equipments UE1 and UE2 are indeed located in the sub coverage areas of the sub-BSs HBS1 and HBS2. Then, the main BS MBS1 respectively transmits handover signals, the allocation of the resource blocks and the related information of the user equipments UE1 and UE2 to the sub-BSs HBS1 and HBS2 at a referential number 720. Then, the main BS MBS1 respectively transmits the handover signals to the user equipments UE1 and UE2 at a referential number 730 to notify the user equipments UE1 and UE2 that the control rights have been handed over to the sub-BSs HBS1 and HBS2. Moreover, the sub-BSs HBS1 and HBS2 also respectively notify the corresponding user equipments UE1 and UE2 at a referential number 740, and start to transmit signal.

In other exemplary embodiments, before the user equipments UE1 and UE2 receive the handover signals, the main BS MBS1 further detects and confirms whether the user equipments UE1 and UE2 can indeed communicate with the sub-BSs HBS1 and HBS2. Since the user equipments UE1 and UE2 are probably influenced by buildings or other factors, although the user equipments UE1 and UE2 are located within the sub coverage areas of the sub-BSs HBS1 and HBS2, they cannot communicate with the sub-BSs HBS1 and HBS2 (i.e. the user equipments UE1 and UE2 are out of the communication ranges of the sub-BSs HBS1 and HBS2). If the user equipments UE1 and UE2 cannot communicate with the sub-BSs HBS1 and HBS2, the user equipments UE1 and UE2 still use the main BS MBS1 to transmit signal. Moreover, after the user equipments UE1 and UE2 receive the handover signals, if it is discovered that handover of the control rights cannot be implemented due to a communication reason or other reasons, the user equipments UE1 and UE2 reply the main BS MBS1 to notify that the handover is failed.

If the sub-BSs HBS1 and HBS2 first detect that the user equipments UE1 and UE2 respectively enter the sub coverage areas of the sub-BSs HBS1 and HBS2 (i.e. the sub-BSs HBS1 and HBS2 respectively initialise the user equipments UE1 and UE2), the sub-BSs HBS1 and HBS2 transmit finding signals at a referential number 750 to notify the main BS MBS1. Then, the main BS MBS1 respectively transmits handover signals, the allocation of the resource blocks and the related information of the user equipments UE1 and UE2 to the sub-BSs HBS1 and HBS2 at a referential number 760. Then, the main BS MBS1 respectively transmits the handover signals to the user equipments UE1 and UE2 at a referential number 770 to notify the user equipments UE1 and UE2 that the control rights have been handed over to the sub-BSs HBS1 and HBS2. Moreover, the sub-BSs HBS1 and HBS2 also respectively notify the corresponding user equipments UE1 and UE2 at a referential number 780, and start to transmit signal.

As described in the aforementioned exemplary embodiment, before the user equipments UE1 and UE2 receive the handover signals, the main BS MBS1 further detects and confirms whether the user equipments UE1 and UE2 can indeed communicate with the sub-BSs HBS1 and HBS2. Moreover, after the user equipments UE1 and UE2 receive the handover signals, if it is discovered that handover of the control rights cannot be implemented due to a communication reason or other reasons, the user equipments UE1 and UE2 reply the main BS MBS1 to notify that the handover is failed. Other detailed descriptions have been presented in the aforementioned exemplary embodiment, which are not repeated herein.

Figure 8:
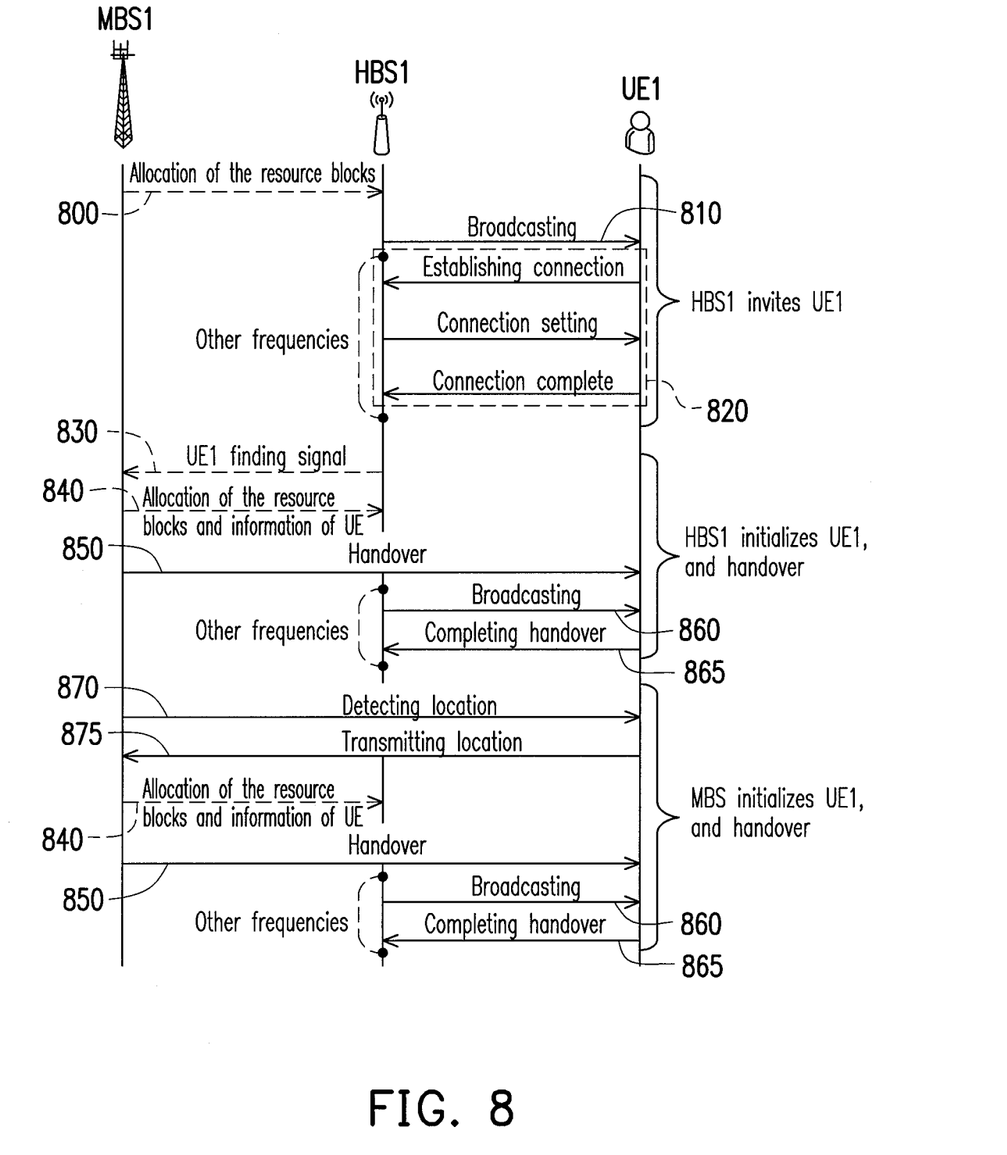
FIG. 8 is a control structural diagram illustrating a process for inviting a user equipment to join a mobile communication system according to an exemplary embodiment of the present disclosure.

When the main BS MBS1 and the sub-BS HBS1 transmit signal, they also transmit cognition messages to invite user equipments having the same mobile communication technique to join the present mobile communication system. The cognition message may include information such as an operation frequency of the main BS MBS1 or the sub-BS HBS1, a network bandwidth, a radio access technology (RAT) (for example, worldwide interoperability for microwave access (WiMAX), wireless fidelity (WiFi), $3^{rd}$ generation partnership project (3GPP)) and time of validity, etc. Moreover, a communication quality between the user equipment and the sub-BS is probably worse than that between the user equipment and the main BS due to a signal shielding effect of buildings or other reasons, so that the method of the exemplary embodiment of the present disclosure can be used to hand over the control right of the user equipment to the BS having a better communication condition, so as to improve the communication quality. Here, assuming the user equipment UE1 is invited by the main BS MBS1 or the sub-BS HBS1, and is ready to join the mobile communication system, as that shown in FIG. 8. FIG. 8 is a control structural diagram illustrating a process for inviting a user equipment to join the mobile communication system according to an exemplary embodiment of the present disclosure.

Before the user equipment UE1 is invited, the main BS MBS1 first transmits the allocation of the resource blocks to the sub-BS HBS1 at a referential number 800. Then, the sub-BS HBS1 starts to broadcast the cognition message to invite the user equipment UE1. After the user equipment UE1 receives the invitation, a radio resource control (RRC) is established between the sub-BS HBS1 and the user equipment at a referential number 820 by using other frequencies.

Then, when the user equipment UE1 moves from the main BS MBS1 to the sub-BS HBS1, and the sub-BS HBS1 first initialises the user equipment UE1, the sub-BS HBS1 sends a finding signal of the user equipment UE1 to the main BS MBS1 at a referential number 830. The main BS MBS1 transmits the allocation of the resource blocks and the related information of the user equipment UE1 to the sub-BS HBS1 at a referential number 840. Then, the main BS MBS1 transmits a handover signal to the user equipment UE1 at a referential number 850. Thereafter, the sub-BS HBS1 uses other frequencies to broadcast the cognition message at a referential number 860, and the user equipment UE1 transmits back a handover completion signal at a referential number 865. In other exemplary embodiments, before the user equipment UE1 receives the handover signal, the main BS MBS1 further detects and confirms whether the user equipment UE1 can indeed communicate with the sub-BS HBS1, so as to avoid a situation that the communication quality is worsened due to the handover.

If the main BS MBS1 first initialises the user equipment UE1, the main BS MBS1 detects a location of the user equipment UE1 at a referential number 870, and the user equipment UE1 transmits back its location for confirmation at a referential number 875. Thereafter, the same steps as that described in the referential numbers 840-875 are repeated, and detailed descriptions thereof are not repeated herein. Moreover, after the user equipment UE1 receives the handover signal, if it is discovered that handover of the control right cannot be implemented due to a communication reason or other reasons, the user equipment UE1 replies the main BS MBS1 to notify that the handover is failed.

In summary, according to the above descriptions, locations of the sub-BSs and the user equipments are received, so as to group the sub-communication devices, and the resource blocks are allocated according to a time-division mechanism or a frequency-division mechanism, etc., so that the sub-BSs and the main BS can simultaneously transmit signal without being interfered, so as to maintain a good communication quality. When the sub-BS detects that the user equipment enters its sub coverage area, the main BS can hand over a control right of the user equipment to the sub-BS, so that the user equipment may have a good communication quality.

It will be apparent to those skilled in the art that various modifications and variations can be made to the structure of the disclosure embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for mobile communication, adapted to a mobile communication system comprising a main base station (BS) and a plurality of sub-communication devices, wherein each of the sub-communication devices is one of a sub-BS and a user equipment, and a sub coverage area of the sub-BS and a location of the user equipment are located in a main coverage area of the main BS, and the method for mobile communication comprising:

obtaining sub-communication device information, wherein the sub-communication device information comprises locations of the sub-communication devices;

grouping the sub-communication devices based on the locations of the sub-communication devices;

obtaining an allocation of resource blocks according to a grouping result, wherein the grouping result comprises at least two groups of the sub-communication devices and the at least two groups of the sub-communication devices are allocated to different resource blocks;

receiving the allocation of the resource blocks by the sub-communication devices for controlling signalling, data transmission and data reception;

enabling usages of same resource blocks by the sub-communication devices allocated in the same resource blocks in response to receipt of the allocation;

determining that a first user equipment is located within a sub coverage area of a first sub-BS, wherein the first user equipment and the first sub-BS are sub-communication devices located in the main coverage area of the main BS; and receiving a handover signal by the first user equipment when the first user equipment is located within the sub coverage area of the first sub-BS, so that the first user equipment transmits and receives data through the first sub-BS, wherein before the first user equipment receives the handover signal, the main BS detects and confirms whether the first user equipment is indeed located within a communication range of the first sub-BS.

2. The method for mobile communication as claimed in claim 1, wherein the step of grouping the sub-communication devices comprises:

when the sub coverage areas of the sub-communication devices are partially overlapped, grouping the overlapped sub-communication devices in one group.

3. The method for mobile communication as claimed in claim 2, wherein the step of obtaining the allocation of the resource blocks according to the grouping result comprises:

allocating the same resource blocks to one of the sub-communication devices of each of the groups, wherein a relative distance between the sub-communication devices allocated in the same resource blocks exceeds a distance threshold.

4. The method for mobile communication as claimed in claim 1, wherein the step of grouping the sub-communication devices comprises:

detecting whether the sub-communication devices are mutually interfered; and grouping the sub-communication devices having a mutual interference level less than an interference threshold into one group.

5. The method for mobile communication as claimed in claim 4, wherein the step of obtaining the allocation of the resource blocks according to the grouping result comprises:

allocating the same or partially overlapped resource blocks to the sub-communication devices of the same group.

6. The method for mobile communication as claimed in claim 1, wherein the step of determining that the first user equipment is located within the sub coverage area of the first sub-BS comprises:

notifying the main BS by the first sub-BS when the first sub-BS detects the first user equipment in the sub coverage area of the first sub-BS; and receiving the allocation of the resource blocks and a first user equipment information by the first sub-BS.

7. The method for mobile communication as claimed in claim 1, wherein after the first user equipment receives the handover signal, if handover cannot be implemented, the first user equipment replies the main BS to notify that the handover is failed.

8. The method for mobile communication as claimed in claim 1, wherein the step of determining that the first user equipment is located within the sub coverage area of the first sub-BS comprises:

obtaining a location of the first user equipment; and transmitting the allocation of the resource blocks and a first user equipment information to the first sub-BS by the main BS when it is determined that the first user equipment is located within the sub coverage area of the first sub-BS.

9. The method for mobile communication as claimed in claim 1, wherein the sub-communication device information comprises interference levels of the sub-communication devices, mobile device bandwidth requirements and positions of the sub-communication devices.

10. The method for mobile communication as claimed in claim 1, wherein the allocation of the resource blocks comprises a plurality of resource allocation units, and each of the resource allocation units comprises a frequency allocation, a time allocation, a frequency-time block, an allocated power level, an allocated code, or any combination of the resource allocation units.

11. A mobile communication system, comprising:

a main base station (BS);

a plurality of sub-communication devices, each of the sub-communication devices being one of a sub-BS and a user equipment, wherein a sub coverage area of the sub-BS and a location of the user equipment are located in a main coverage area of the main BS; and a location server, used for obtaining sub-communication device information, wherein the sub-communication device information comprises locations of the sub-communication devices, the location server groups the sub-communication devices based on the locations of the sub-communication devices, and the main BS and the sub-BS obtain an allocation of resource blocks according to a grouping result, the sub-communication devices allocated in same resource blocks enable usages of the same resource blocks in response to receipt of the allocation, wherein the grouping result comprises at least two groups of the sub-communication devices and the at least two groups of the sub-communication devices are allocated to different resource blocks, wherein the sub-communication devices comprise a first user equipment and a first sub-BS, and the main BS sends a handover signal to the first user equipment, so that the first user equipment transmits and receives data through the first sub-BS, wherein before the first user equipment receives the handover signal, the main BS detects and confirms whether the first user equipment is indeed located within a communication range of the first sub-BS.

12. The mobile communication system as claimed in claim 11, wherein when the sub coverage areas of the sub-communication devices are partially overlapped, the location server groups the overlapped sub-communication devices in one group.

13. The mobile communication system as claimed in claim 12, wherein the location server allocates the same resource blocks to one of the sub-communication devices of each of the groups, wherein a relative distance between the sub-communication devices allocated in the same resource blocks exceeds a distance threshold.

14. The mobile communication system as claimed in claim 11, wherein the sub-communication devices detect a mutual interference there between, and the location server groups the sub-communication devices having a mutual interference level less than an interference threshold into one group.

15. The mobile communication system as claimed in claim 14, wherein the location server allocates the same or partially overlapped resource blocks to the sub-communication devices of the same group.

16. The mobile communication system as claimed in claim 11, wherein when the first sub-BS detects the first user equipment in the sub coverage area of the first sub-BS, the first sub-BS notifies the main BS, and the main BS transmits the allocation of the resource blocks and a first user equipment information to the first sub-BS.

17. The mobile communication system as claimed in claim 11, wherein after the first user equipment receives the handover signal, if handover cannot be implemented, the first user equipment replies the main BS to notify that the handover is failed.

18. The mobile communication system as claimed in claim 11, wherein after the main BS obtains a location of the first user equipment, when the location server detects that the first user equipment is located within the sub coverage area of the first sub-BS, and the main BS transmits the allocation of the resource blocks and a first user equipment information to the first sub-BS.

19. A method for mobile communication, adapted to one of a plurality of sub-communication devices of a mobile communication system, wherein the mobile communication system further comprises a main base station (BS), each of the sub-communication devices is one of a sub-BS and a user equipment, wherein a sub coverage area of the sub-BS and a location of the user equipment are located in a main coverage area of the main BS, and the method for mobile communication comprising:

transmitting sub-communication device information, wherein the sub-communication device information comprises location of the sub-communication device;

receiving an allocation of the resource blocks by the sub-communication device for controlling signaling, data transmission and data reception, wherein the allocation of the resource blocks is based on a grouping result, and the sub-communication devices are grouped based on the locations of the sub-communication devices, wherein the grouping result comprises at least two groups of the sub-communication devices, and the at least two groups of the sub-communication devices are allocated to the different resource blocks;

enabling usages of the resource blocks by the sub-communication device in response to receipt of the allocation;

determining that a first user equipment is located within a sub coverage area of a first sub-BS, wherein the first user equipment and the first sub-BS are sub-communication devices; and     transmitting a handover signal to a first user equipment from a first sub-BS, so that the first user equipment transmits and receives data through the first sub-BS, wherein before the first user equipment receives the handover signal, whether the first user equipment is indeed located within a communication range of the first sub-BS is determined and confirmed.

20. The method for mobile communication as claimed in claim 19, wherein the step of determining that the first user equipment is located within the sub coverage area of the first sub-BS comprises:

notifying the main BS by the first sub-BS when the first sub-BS detects the first user equipment in the sub coverage area of the first sub-BS;

receiving the allocation of the resource blocks and a first user equipment information by the first sub-BS.

21. The method for mobile communication as claimed in claim 19, wherein the step of determining that the first user equipment is located within the sub coverage area of the first sub-BS comprises:

transmitting a location of the first user equipment to the main BS; and     receiving the allocation of the resource blocks and a first user equipment information from the main BS when it is determined that the first user equipment is located within the sub coverage area of the first sub-BS.

22. The method for mobile communication as claimed in claim 19, wherein after the first user equipment receives the handover signal, if handover cannot be implemented, the first user equipment replies the main BS to notify that the handover is failed.

23. The method for mobile communication as claimed in claim 19, wherein the sub-communication device information comprises interference levels of the sub-communication devices, mobile device bandwidth requirements and positions of the sub-communication devices.

24. The method for mobile communication as claimed in claim 19, wherein the allocation of the resource blocks comprises a plurality of resource allocation units, and each of the resource allocation units comprises a frequency allocation, a time allocation, a frequency-time block, an allocated power level, an allocated code, or any combination of the resource allocation units.

* * * * *